(12) United States Patent
Sato et al.

(10) Patent No.: US 10,133,069 B2
(45) Date of Patent: Nov. 20, 2018

(54) VEHICLE DISPLAY DEVICE

(71) Applicant: Yazaki Corporation, Tokyo (JP)

(72) Inventors: Gosei Sato, Makinohara (JP);
Kiyokazu Yoneyama, Makinohara (JP);
Yoshiharu Matsuo, Makinohara (JP)

(73) Assignee: YAZAKI CORPORATION,
Minato-ku, Tokyo (JP)

( * ) Notice: Subject to any disclaimer, the term of this patent is extended or adjusted under 35 U.S.C. 154(b) by 0 days.

(21) Appl. No.: 15/432,366

(22) Filed: Feb. 14, 2017

(65) Prior Publication Data

US 2017/0153453 A1 Jun. 1, 2017

Related U.S. Application Data

(63) Continuation of application No. PCT/JP2015/076256, filed on Sep. 16, 2015.

(30) Foreign Application Priority Data

Sep. 19, 2014 (JP) ................. 2014-191551

(51) Int. Cl.
*G02B 27/14* (2006.01)
*G02B 27/01* (2006.01)
*B60K 35/00* (2006.01)
*B60K 37/02* (2006.01)
*G01D 7/06* (2006.01)

(52) U.S. Cl.
CPC .......... *G02B 27/0101* (2013.01); *B60K 35/00* (2013.01); *B60K 37/02* (2013.01);
(Continued)

(58) Field of Classification Search
CPC ........ G02B 27/0101; G02B 2027/0154; B60K 35/00; B60K 2350/352; B60K 2350/2069;
(Continued)

(56) References Cited

U.S. PATENT DOCUMENTS 6,317,037 B1    11/2001    Ayres et al.
2006/0092098 A1  5/2006    Yokota et al.
(Continued)

FOREIGN PATENT DOCUMENTS

DE    10 2005 026 787 A1    12/2006
JP         2006-132951 A      5/2006
(Continued)

OTHER PUBLICATIONS

International Search Report of PCT/JP2015/076256, dated Dec. 8, 2015. [PCT/ISA/210].

(Continued)

*Primary Examiner* — Alicia M Harrington
(74) *Attorney, Agent, or Firm* — Sughrue Mion, PLLC (57) ABSTRACT

There is provided a vehicle display device capable of simplifying a configuration for a passenger. A ring member is provided to be closer to the front side (opposite to the passenger) than a half mirror, and thus the configuration for the passenger can be further simplified than the half mirror, thereby achieving a simple appearance. The ring member is visually confirmed through the half mirror thereby to display the ring member and an image in combination like a configuration in which a decorative member is provided to be closer to the passenger than the display as conventionally.

10 Claims, 7 Drawing Sheets

(52) U.S. Cl.
CPC ............... *G01D 7/06* (2013.01); *G02B 27/01* (2013.01); *B60K 2350/1072* (2013.01); *B60K 2350/206* (2013.01); *B60K 2350/2017* (2013.01); *B60K 2350/2039* (2013.01); *B60K 2350/2052* (2013.01); *B60K 2350/2056* (2013.01); *B60K 2350/2069* (2013.01); *B60K 2350/2095* (2013.01); *B60K 2350/352* (2013.01); *G02B 2027/0154* (2013.01)

(58) Field of Classification Search
CPC .... B60K 2350/1072; B60K 2350/2052; B60K 2350/2039
See application file for complete search history.

(56) References Cited

U.S. PATENT DOCUMENTS

2008/0191963 A1  8/2008  Ootaki et al.

2013/0186324 A1  7/2013  Kato

FOREIGN PATENT DOCUMENTS

| | | |
|---|---|---|
| JP | 2006-177920 A | 7/2006 |
| JP | 2007-17168 A | 1/2007 |
| JP | 2008-30638 A | 2/2008 |
| JP | 2008-254703 A | 10/2008 |
| JP | 2009-192434 A | 8/2009 |
| JP | 2012-56384 A | 3/2012 |
| JP | 2012-106702 A | 6/2012 |
| JP | 2013-147196 A | 8/2013 |
| KR | 10-0828868 B1 | 5/2008 |

OTHER PUBLICATIONS

Communication drafted Nov. 30, 2016, from the Japanese Patent Office in counterpart application No. 2014-191551.
Communication dated Aug. 29, 2018 issued by the German Patent and Trademark Office in counterpart application No. 11 2015 004 240.7.

VEHICLE DISPLAY DEVICE

This application is a continuation of International Application No. PCT/JP2015/076256, filed Sep. 16, 2015, that claims priority from Japanese Application No. 2014-191551, filed Sep. 19, 2014, each of which is incorporated herein by reference in its entirety.

TECHNICAL FIELD

The present invention relates to a vehicle display device provided in an instrument panel of a vehicle.

BACKGROUND ART

An instrument panel of a vehicle is provided with a vehicle display device having a display capable of displaying a vehicle speed, an engine rotation frequency, the amount of remaining fuel, a temperature of cooling water, and the like as images. In the vehicle display device, an image to be displayed is switched depending on a vehicle driving state and emphasized to be displayed as needed, or an image is combined with other member, thereby enhancing visibility and design.

There is proposed, as a vehicle display device for combining an image and another member, a vehicle display device including a partition member (decorative member) for surrounding part of a display area on a display (see Patent Literature 1, for example). In the vehicle display device described in Patent Literature 1, a partition member is formed to be circular and is arranged in front of the display (closer to a passenger), and part of the display area on the display is visually confirmed through the inside of the partition member. When an image in the area surrounded by the partition member is displayed to move on the display, the partition member is accordingly slid, thereby further enhancing design.

CITATION LIST

Patent Literature

Patent Literature 1: JP 2006-132951 A

SUMMARY OF INVENTION

Technical Problem

However, in the vehicle display device including a partition member, the partition member needs to be arranged on the display closer to the passenger in order to display the partition member and an image in combination, which makes the configuration of the display for the passenger complicated. In particular, when the partition member is slid as described above, the configuration of the display for the passenger is made more complicated due to an operation mechanism for sliding movement.

It is an object of the present invention to provide a vehicle display device capable of simplifying a configuration for the passenger.

Solution to Problem

In order to solve the problem and achieve the object, the invention according to a first aspect is characterized by including a vehicle display device provided in an instrument panel of a vehicle and directed for displaying an image toward a passenger, including: a projector for projecting the image toward a crossing direction with the front-back direction of the vehicle; a reflective member for reflecting an image projected by the projector toward the rear side of the vehicle and transmitting a light from the front side of the vehicle; a decorative member provided closer to the front side of the vehicle than the reflective member; and a light emitting means for lighting to cause the decorative member to be visually confirmed from the rear side of the vehicle through the reflective member.

The invention according to a second aspect is characterized by further including: a control means for switching on or off the light emitting means depending on the image thereby to switch a bright state in which the decorative member can be visually confirmed and a dark state in which it cannot be visually confirmed in the invention according to the first aspect.

The invention according to a third aspect is characterized in that the light emitting means has at least one of an irradiation means for irradiating a light toward the decorative member and a light emitting member provided in the decorative member for lighting in the invention according to the first aspect or second aspect.

The invention according to a fourth aspect is characterized in that the decorative member is configured to change a tilt angle in the front-back direction in the invention according to any one of the first to third aspects.

The invention according to a fifth aspect is characterized in that the projector is provided above the reflective member, the reflective member is provided to be tilted with its reflective face faced toward the projector and the rear side of the vehicle, and the decorative member is configured to change the tilt angle between an erect position in which its front part is faced toward the rear side of the vehicle and a tilt position in which the front part is tilted to be faced upward relative to the erect position in the invention according to the fourth aspect.

The invention according to a sixth aspect is characterized in that the decorative member is formed to be horizontally movable in a crossing plane with the front-back direction in the invention according to any one of the first to fifth aspects.

The invention according to a seventh aspect is characterized in that the decorative member is configured in a circle shape to surround at least part of the image reflected by the reflective member and visually confirmed by the passenger in the invention according to any one of the first to sixth aspects.

Advantageous Effects of Invention

According to the invention of the first aspect, the decorative member is provided closer to the front side (opposite to the passenger) than the reflective member, and thus the configuration for the passenger can be further simplified than the reflective member, thereby achieving a simple appearance. At this time, the decorative member is visually confirmed through the reflective member thereby to display the decorative member and an image in combination similarly to the configuration in which the decorative member is provided closer to the passenger than the display as conventionally. Further, an image can be displayed and visually confirmed even at a position overlapping on the decorative member, thereby achieving a variety of expressions.

According to the invention of the second aspect, the control means switches on or off the light emitting means to switch the decorative member between the bright state and the dark state, and thus the decorative member is set in the bright state thereby to display an image and the decorative member in combination, and the decorative member is set in the dark state thereby to display only an image. With the configuration in which the decorative member is provided closer to the passenger than the display as conventionally, the partition member is always present on the display area, and thus the entire display cannot be used as display area, a size of a displayable image is limited, and an image always needs to be displayed in combination with the partition member, which causes a limited variety of expressions. In contrast with the configuration, according to the invention of the second aspect, the decorative member is set in the dark state thereby to use the entire reflective face of the reflective member as display area, thereby displaying an enlarged image. Further, only an image can be displayed, thereby achieving a variety of expressions.

According to the invention of the third aspect, when the light emitting means has an irradiation means, a part of the decorative member on which a light is irradiated can be visually confirmed by the passenger. On the other hand, when the light emitting means has a light emitting member, a part of the decorative member in which the light emitting member is provided is particularly bright to be visually confirmed by the passenger.

According to the invention of the fourth aspect, the decorative member is configured to change a tilt angle, and thus the decorative member is tilted as needed depending on an image to be displayed, thereby achieving a wider variety of expressions in combination of an image and the decorative member as needed.

According to the invention of the fifth aspect, the projector is provided above the reflective member, and thus the projector can be housed in the hood of the instrument panel, for example, thereby easily securing an installation space. Further, the reflective member is tilted with the reflective face faced toward the projector and the rear side of the vehicle, or tilted toward the rear side of the vehicle downward, and the decorative member is configured to tilt with the front part faced toward the projector above, and thus the decorative member can be tilted to be housed below the reflective member in a small space, thereby preventing an increase in size of the entire vehicle display device.

According to the invention of the sixth aspect, the decorative member is configured to be horizontally movable, and thus the decorative member is moved to an appropriate position depending on an image to be displayed, thereby achieving a wider variety of expressions.

According to the invention of the seventh aspect, the decorative member is formed to be circular thereby to emphasize a part of a displayed image surrounded by the decorative member and to further enhance design.

DESCRIPTION OF EMBODIMENTS

Figure 1:
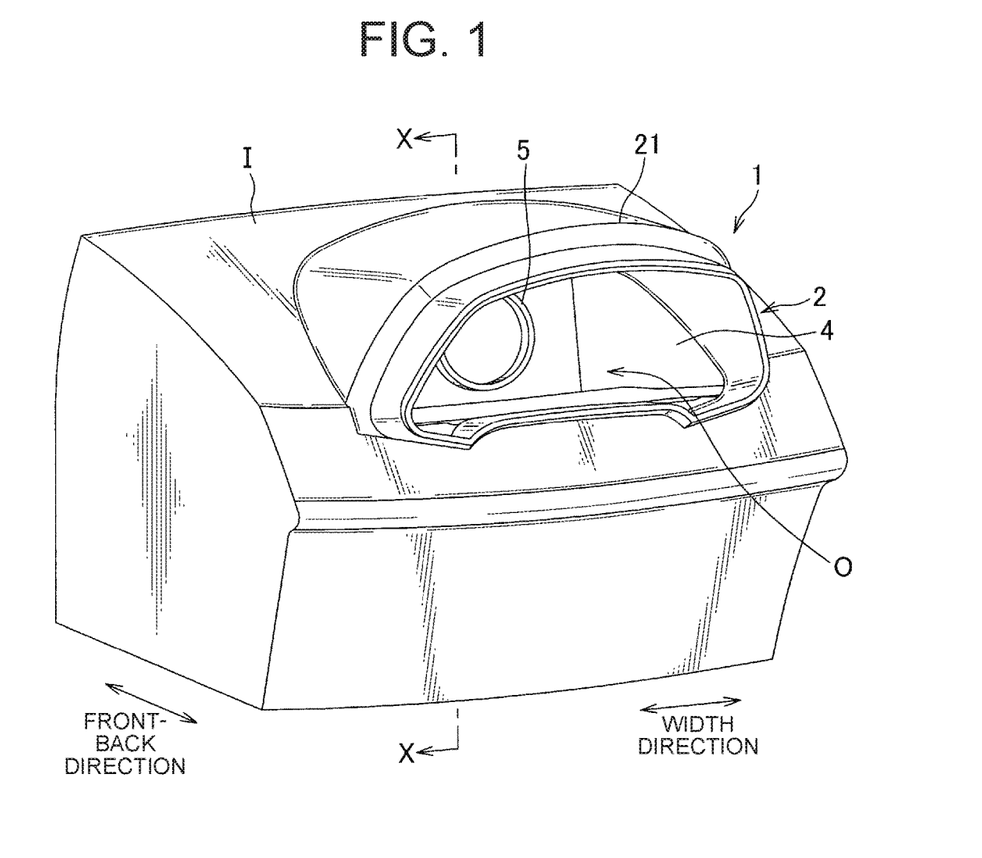
FIG. 1 is a perspective view illustrating a vehicle display device according to an embodiment of the present invention.
Figure 2:
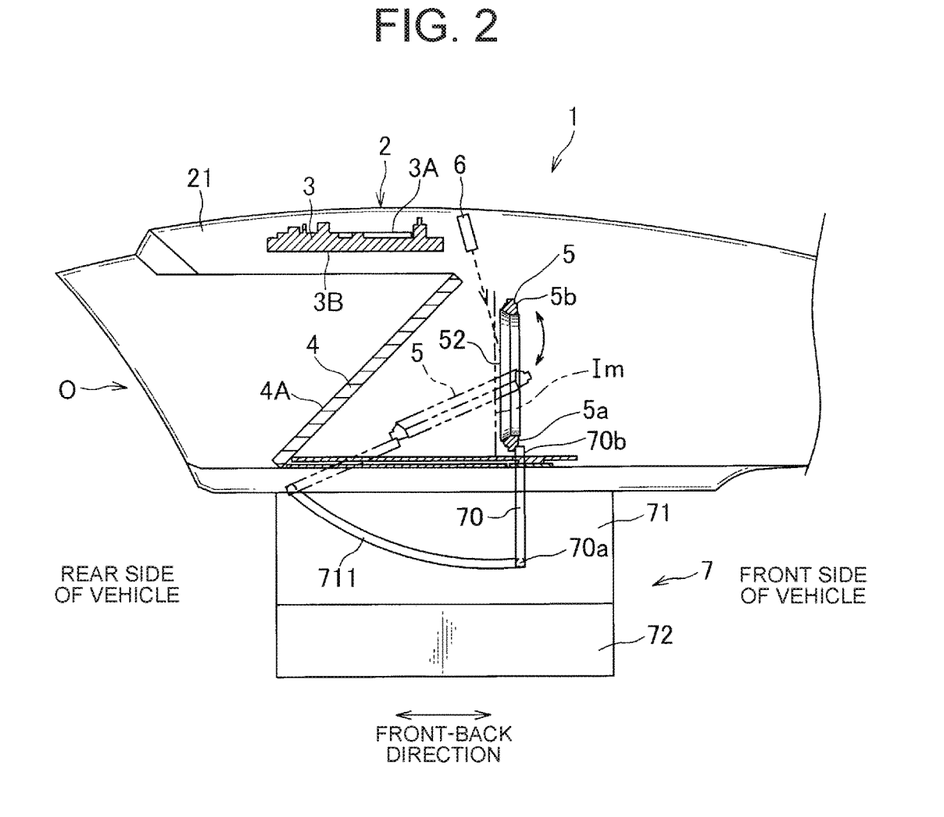
FIG. 2 is a cross-section view along the line X-X of FIG. 1.
Figure 4:
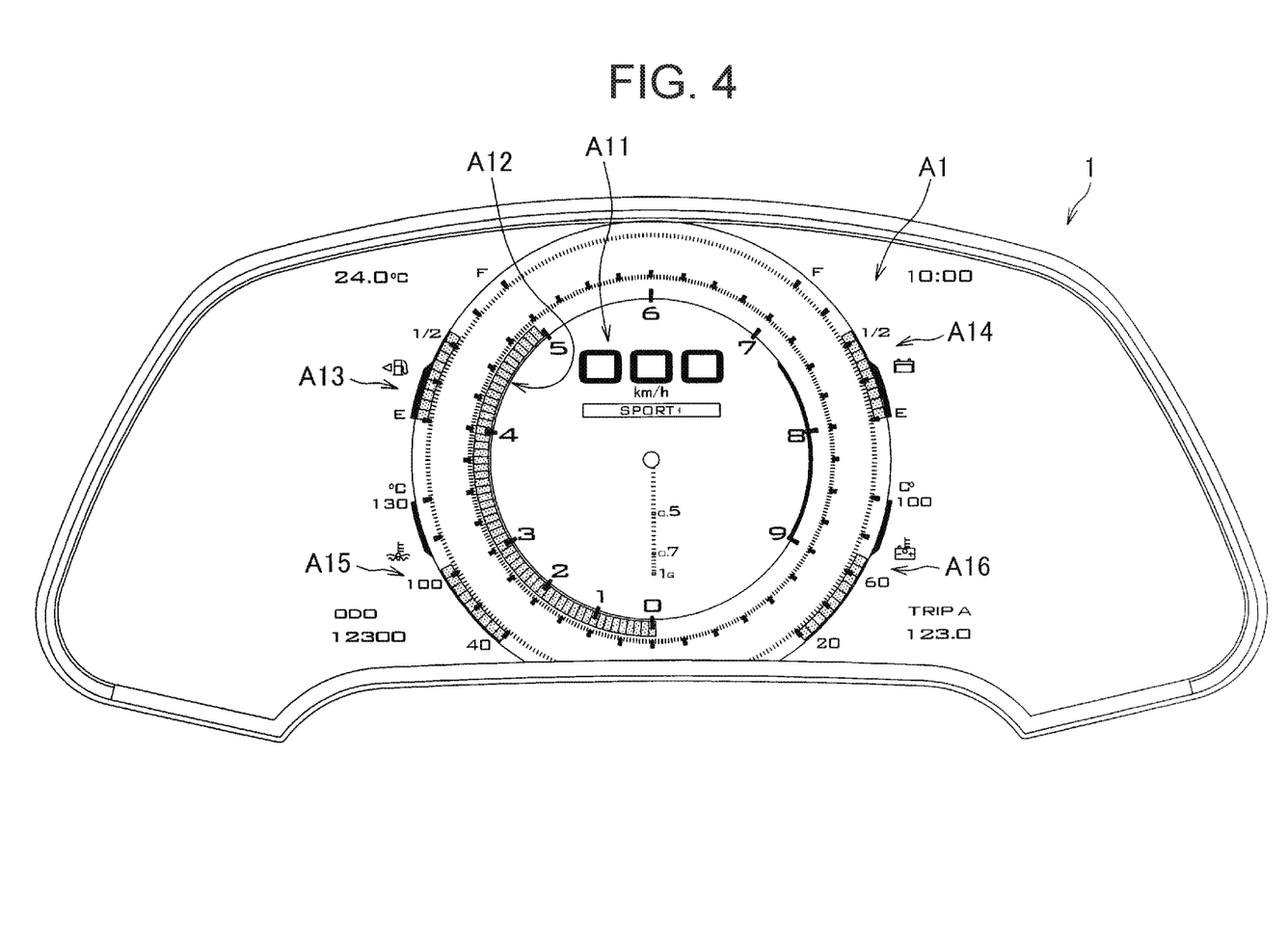
FIG. 4 is a front view illustrating an exemplary image displayed by the vehicle display device of FIG. 1.
Figure 5:
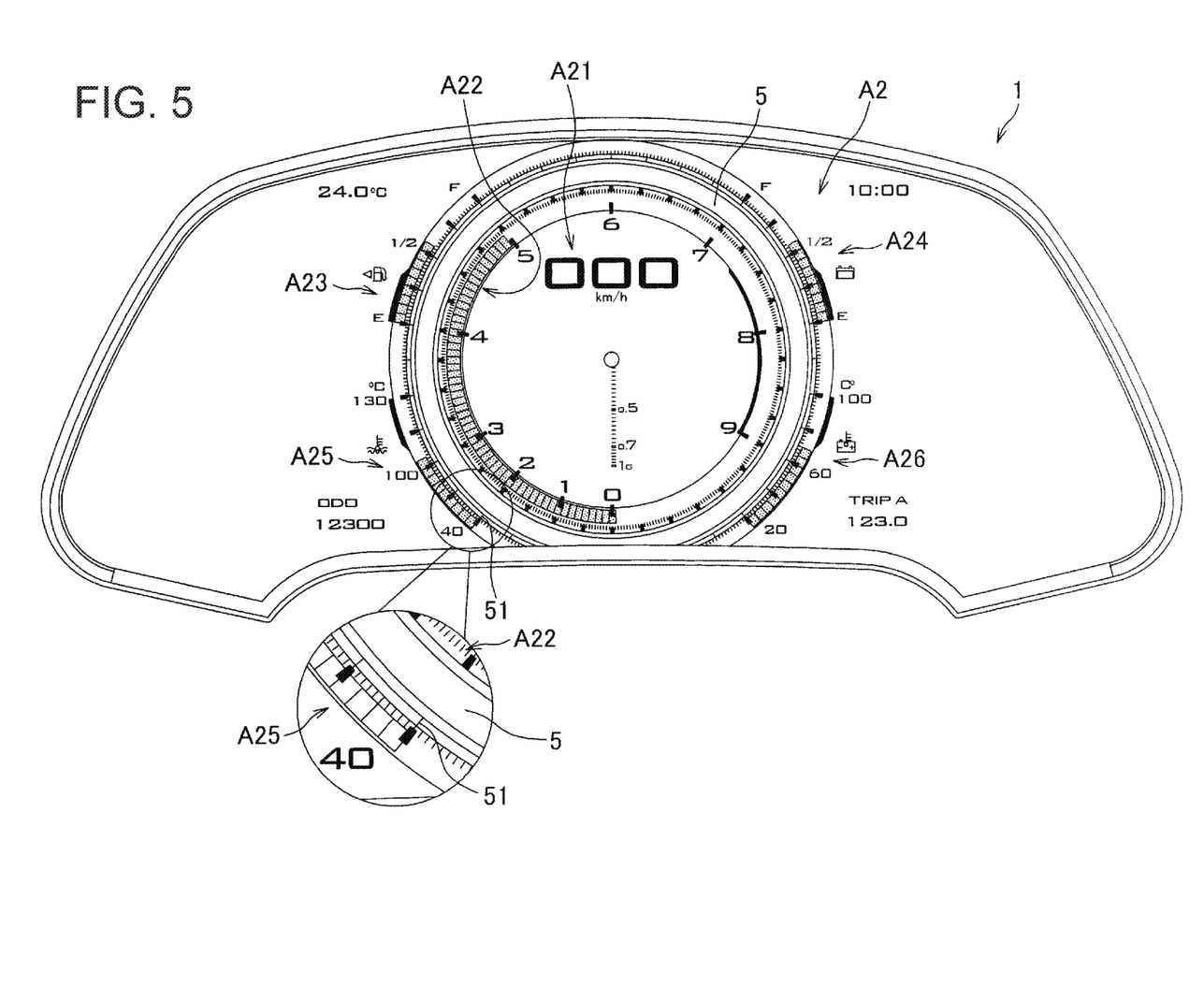
FIG. 5 is a front view illustrating another exemplary image displayed by the vehicle display device of FIG. 1.

Each embodiment of the present invention will be described below with reference to the drawings. A vehicle display device 1 according to the present embodiment includes a case 2 integrally formed with an instrument panel I of a vehicle (not illustrated), a projector 3 for projecting an image, a half mirror 4 as reflective member for reflecting an image projected by the projector 3, a ring member 5 as decorative member provided closer to the front side of the vehicle than the half mirror 4, an irradiation means 6 for irradiating a light toward the ring member 5, an operation mechanism 7 for operating the ring member 5, and a meter ECU (not illustrated) as control means for controlling the projector 3, the irradiation means 6 and the operation mechanism 7 as illustrated in FIGS. 1 and 2. The vehicle display device 1 is provided in a hybrid car traveling by a gasoline engine and a motor, for example, and is configured to display various items of information of the vehicle as images as illustrated in FIGS. 4 and 5.

The case 2 has a hood 21 formed to cover the top of the instrument panel I, and houses therein the projector 3, the half mirror 4, the ring member 5, and the irradiation means 6. An opening O is formed in the case 2 on the rear side of the vehicle, and a passenger on the rear side of the vehicle can visually confirm the inside of the case 2 through the opening O. Further, when a light emitting member other than the irradiation means 6 described below is not provided inside the case 2 on the front side of the vehicle relative to the half mirror 4, and the irradiation means 6 is not lit, the inside of the case 2 is kept dark.

The projector 3 is entirely formed in a plate shape, is housed in the hood 21, and is fixed on a bottom face of the hood 21 by a fixing member such as screw (not illustrated) with a top face 3A as attachment face. Further, the projector 3 is configured to project an image downward with a bottom face 3B as projection face.

The half mirror 4 is formed in a plate shape with a top face 4A as reflective face, is provided below the projector 3, and is provided with the top face 4A tilted upward and toward the rear side of the vehicle. That is, the half mirror 4 is tilted toward the rear side of the vehicle downward. An image projected from the projector 3 downward is reflected toward the rear side of the vehicle by the half mirror 4, and thus the image seems to the passenger to be displayed in a virtual image plane Im on the front side of the vehicle relative to the half mirror 4. The virtual image plane Im is orthogonal to the front-back direction of the vehicle. According to the present embodiment, the virtual image plane Im is assumed to be formed slightly toward the rear side of the vehicle relative to the ring member 5, but a relative position between the virtual image plane Im and the ring member 5 may be set as needed depending on an image to be combined. Further, the half mirror 4 is configured to transmit a light from the front side of the vehicle toward the rear side of the vehicle.

Figure 3:
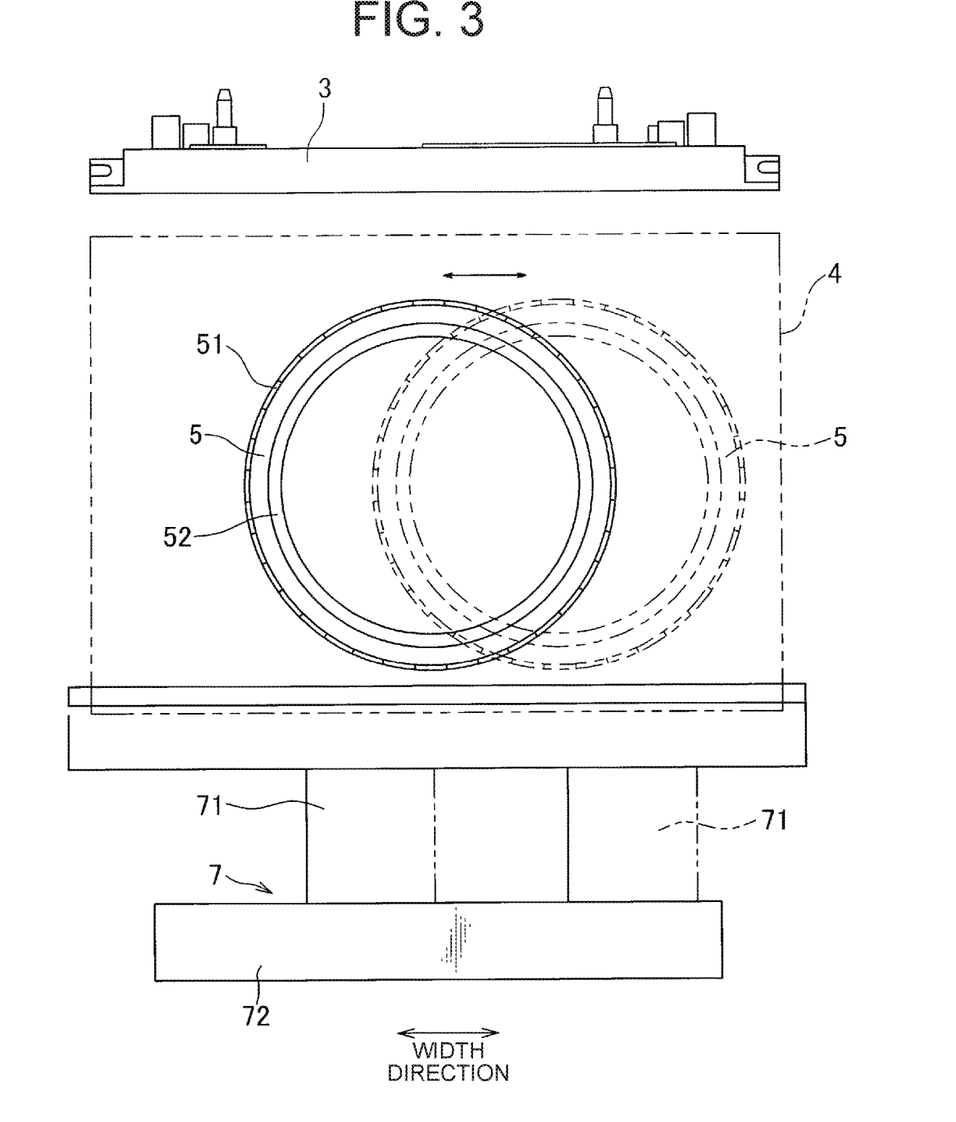
FIG. 3 is a front view illustrating essential parts of the vehicle display device of FIG. 1.

The ring member 5, for example, glazed in its face like metal, is formed to be circular, and is configured to surround and emphasize part of an image visually confirmed by the passenger. A plurality of grooves 51 are formed at substantially equal intervals on the outer periphery of the ring member 5 as illustrated in FIG. 3. Further, a lower end 5a of the ring member 5 is supported by an arm part 70 described below of the operation mechanism 7. With the operation mechanism 7 described below, the ring member 5 is configured to change its tilt angle relative to the front-back direction of the vehicle as illustrated in FIG. 2, and is configured to horizontally movable in the width direction of the vehicle as illustrated in FIG. 3.

The irradiation means 6 has an LED device, for example, is provided above the ring member 5, and is configured to irradiate a light from the rear side of the vehicle toward the ring member 5. The irradiation means 6 is fixed at a point according to the present embodiment, but may be configured to change an angle to irradiate a light depending on a tilt angle of the ring member 5 or may be installed at a plurality of points. The irradiation means 6 is fixed at one point, and thus a tilt angle of the ring member 5 is changed so that a part where a light may be easily irradiated is changed and the inside of the ring member 5 may be contrasted, thereby showing a sense of three-dimensionality.

The operation mechanism 7 has the armpart 70 for supporting the ring member 5, a tilt unit 71 for tilting the ring member 5, and a slide unit 72 for horizontally moving the ring member 5.

The tilt unit 71 includes a rail part 711 for guiding the arm part 70, and a first actuator (not illustrated) for moving the arm part 70 in the front-back direction. One end 70a is guided to the arc-shaped rail part 711 and thus the other end 70b supporting the ring member 5 moves in the front-back direction and moves toward the rear side of the vehicle so that the arm part 70 may be entirely tilted in the front-back direction. The ring member 5 is also tilted along with the tilt of the arm part 70. The end 70b of the arm part 70 is positioned on the front side of the vehicle so that the ring member 5 may be at an erect position in which a front part 52 is faced to the rear side of the vehicle as indicated in solid line in FIG. 2, and the end 70b is positioned on the rear side of the vehicle so that the ring member 5 may be at a tilt position in which the front part 52 is tilted upward relative to the erect position as indicated in chained line. The ring member 5 is configured to change a tilt angle between the erect position and the tilt position by the tilt unit 71. Further, the lower end 5a is moved to the rear side of the vehicle and the front part 52 is tilted upward at the tilt position so that the ring member 5 may be housed below the tilted half mirror 4 and an upper end 5b seldom moves to the front side of the vehicle.

The slide unit 72 is provided below the tilt unit 71, and includes a second actuator (not illustrated) for horizontally moving the entire tilt unit 71 in the width direction of the vehicle. The second actuator is operated so that the ring member 5 horizontally may move in the width direction of the vehicle as illustrated in FIG. 3.

There will be described below how the meter ECU controls the projector 3, the irradiation means 6, and the operation mechanism 7 to display an image or to cause the passenger to visually confirm the image and the ring member 5 in combination. The background of each image and a part thereof overlapping on the ring member 5 are set in black.

At first, when only an image is displayed for the passenger, the meter ECU causes the projector 3 to project an image, and the irradiation means 6 to turn off. At this time, the ring member 5 is in a dark state in which an irradiated light by the irradiation means 6 is not reflected, and a light emitted by the ring member 5 is too weak to transmit through the half mirror 4. Further, a part of the image, which overlaps on the ring member 5, is set in black, and thus the passenger can visually confirm only the image without visually confirming the ring member 5.

When an image and the ring member 5 are displayed in combination, the meter ECU causes the projector 3 to project the image, and the irradiation means 6 to turn off. At this time, the ring member 5 reflects an irradiated light by the irradiation means 6 to be in a bright state due to light emitting, and the reflected light transmits through the half mirror 4 to travel to the rear side of the vehicle. Thus, the passenger can visually confirm the ring member 5 and the image, which seem to the passenger to be combined. At this time, a part of the image, which overlaps on the ring member 5, is set in black, and thus the ring member 5 does not seem to the passenger to be overlapped on the image, and seems to be displayed similarly to the configuration in which the ring member is provided in front of the display as conventionally. A part of the image, which overlaps on the ring member 5, is displayed as needed, and thus the ring member 5 and the image may be displayed to be overlapped. As described above, the irradiation means 6 lights to set the ringmember 5 in the visually-confirmable bright state, and functions as light emitting means.

At this time, the meter ECU further controls the operation mechanism 7 depending on an image to be combined with the ring member 5. For example, when an image displays a precise circle meter, the meter ECU controls the tilt unit 71, positions the ring member 5 at the erect position, and combines it to surround the meter. Further, when an image displays a tilted circle meter and is to be visually confirmed in a sterical manner, the ring member 5 is tilted according to the meter to be combined therewith.

Further, when an image is horizontally moved within the virtual image plane Im in the width direction of the vehicle and accordingly the ring member 5 is horizontally moved, the meter ECU controls the slide unit 72. At this time, a timing when the ring member 5 is moved may be according to a timing when the image is moved or may be slightly offset therefrom. Further, the ring member 5 may be horizontally moved at the erect position or may be horizontally moved at an appropriate tilt angle.

Exemplary images displayed by the vehicle display device 1 and exemplary combinations of an image and the ring member 5 in the above method will be described below.

When the passenger selects a sports mode, the vehicle display device 1 displays a first image A1 illustrated in FIG. 4. The first image A1 has a speed display part A11 for displaying a speed of the vehicle, a rotation frequency display part A12 for displaying an engine rotation frequency, a remaining fuel display part A13 for displaying the amount of remaining fuel, a remaining capacity display part A14 for displaying the amount of remaining battery, a cooling water temperature display part A15 for displaying a temperature of cooling water, and a battery temperature display part A16 for displaying a temperature of the battery. At this time, the ring member 5 is in the dark state, cannot be visually confirmed by the passenger, and does not hide the first image A1.

During normal traveling, the vehicle display device 1 displays a second image A2 illustrated in FIG. 5. The second image A2 has a speed display part A21, a rotation frequency display part A22, a remaining fuel display part A23, a remaining capacity display part A24, a cooling water temperature display part A25, and a battery temperature display part A26 as with the first image A1. At this time, the ring member 5 is positioned at the erect position in the bright state, the remaining fuel display part A23, the remaining capacity display part A24, the cooling water temperature display part A25, and the battery temperature display part A26 are displayed around the ring member 5, and the grooves 51 formed along the outer periphery of the ring member 5 are a gage of each of the display parts A23 to A26. A part of the second image A2, which overlaps on the ring member 5 (between the rotation frequency display part A22 and each of the display parts A23 to A26), is displayed to be dark so that the ring member 5 may seem similar to the configuration in which it is provided in front of the display.

Figure 6:
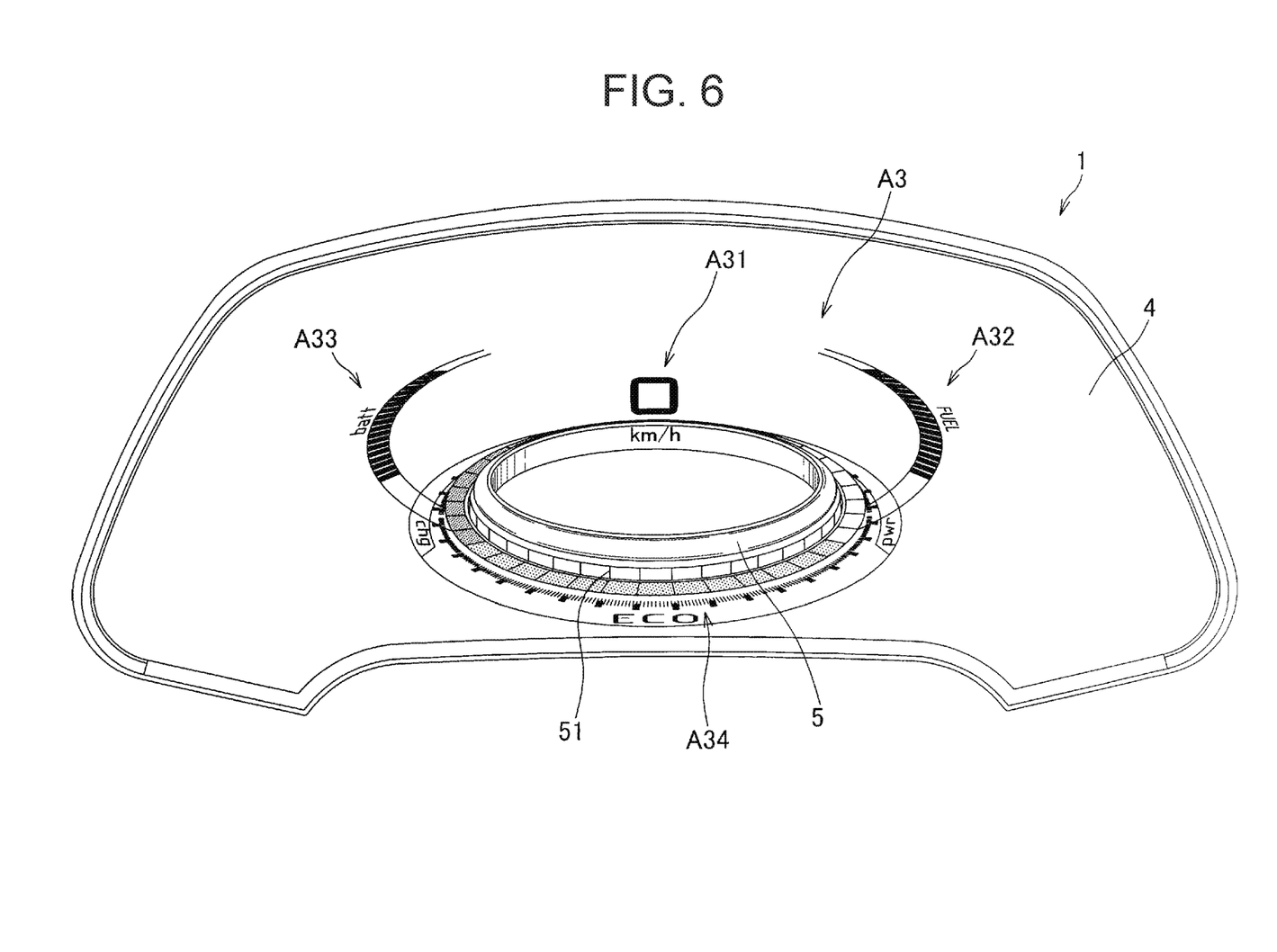
FIG. 6 is a front view illustrating still other exemplary image displayed by the vehicle display device of FIG. 1.
Figure 7:
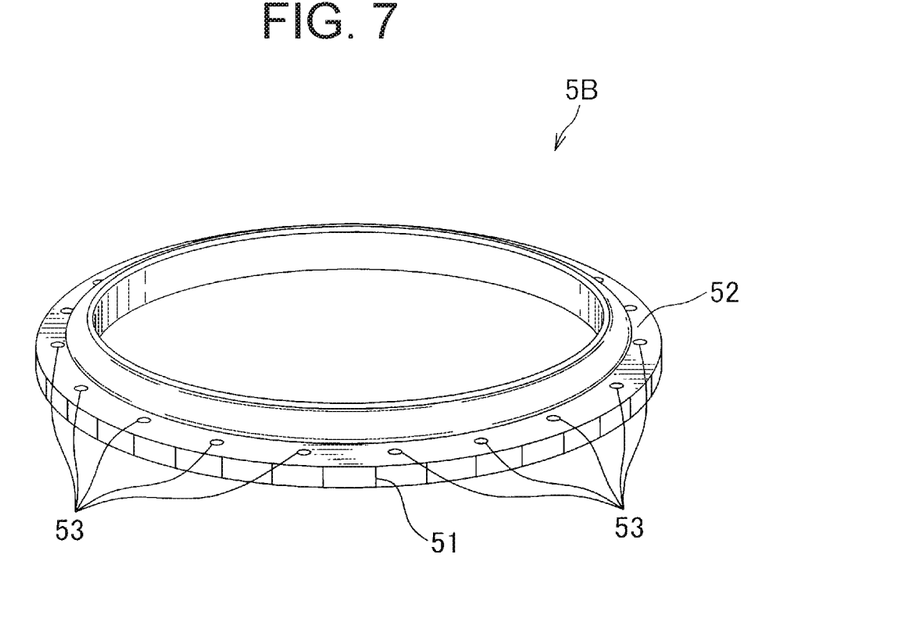
FIG. 7 is a perspective view illustrating a ring member of a vehicle display device according to a variant of the resent invention.

When the passenger selects an eco-mode, the vehicle display device 1 displays a third image A3 illustrated in FIG. 6. The third image A3 has a speed display part A31 for displaying a speed of the vehicle, a remaining fuel display part A32 for displaying the amount of remaining fuel, a remaining capacity display part A33 for displaying the amount of remaining battery, and a charge/discharge display part A34 for displaying a charge/discharge state of the battery. The charge/discharge display part A34 is formed in a circle shape tilted in the front-back direction, lights toward the right side to indicate a larger amount of discharged battery, and lights toward the left side to indicate a larger amount of charged battery by regenerative energy assuming its center part as neutral position. At this time, the ring member 5 is positioned at the tilt position in the bright state, the charge/discharge display part A34 is displayed around the ring member 5, and the grooves 51 formed along the outer periphery of the ring member 5 are a gauge of the charge/discharge display part A34. In this way, the third image A3 and the ring member 5 in combination are visually confirmed, thereby sterically displaying the third image A3 by use of a sense of three-dimensionality of the ring member 5.

According to the present embodiment, the following effect is obtained. That is, the ring member 5 is provided closer to the front side than the half mirror 4 (opposite to the passenger), and thus the configuration for the passenger can be further simplified than the half mirror 4 thereby to achieve a simple appearance. At this time, the ring member 5 is visually confirmed through the half mirror 4, thereby displaying the ring member 5 and an image in combination similarly to the configuration in which the decorative member is provided closer to the passenger than the display as conventionally.

Further, when the second image A2 or the third image A3 is displayed, the irradiation means 6 is lit to set the ring member 5 in the bright state, thereby displaying the second image A2 or the third image A3 and the ring member 5 in combination. Further, when the first image A1 is displayed, the irradiation means 6 is turned off to set the ring member 5 in the dark state, thereby displaying only the first image A1. At this time, the entire reflective face of the half mirror 4 (or the entire virtual image plane Im) can be used as display area, thereby largely displaying the first image A1.

Further, the ring member 5 can be tilted by the tilt unit 71, and thus the ring member 5 is set in the bright state at an appropriate tilt angle depending on an image to be displayed, thereby achieving a variety of expressions in combination of an image and the ring member 5 as needed. At this time, the ring member 5 is tilted to be housed below the half mirror 4, thereby tilting in a small space and preventing an increase in size of the entire vehicle display device 1.

Further, the ring member 5 is configured to be horizontally movable in the width direction by the slide unit 72, and thus the ring member 5 is moved to an appropriate position depending on an image to be displayed, thereby achieving a wider variety of expressions.

The present invention is not limited to the embodiment and encompasses other configurations capable of achieving the object of the present invention, and the following variants and the like are encompassed in the present invention.

For example, the irradiation means 6 for irradiating a light on the ring member 5 functions as light emitting means according to the embodiment, but there may be configured such that the front part 52 of a ring member 5B is provided with a plurality of LEDs 53 as light emitting members and the LEDs 53 are lit so that the ring member 5B may emit a light and enters the bright state and the LEDs 53 function as light emitting means as illustrated in FIG. 6. With the configuration, the ringmember 5B with the lit LEDs 53 is combined with an image thereby to achieve a variety of expressions. When the LEDs 53 are provided, the LEDs 53 and the irradiation means 6 may be combined and lit as needed depending on an image to be displayed, or the irradiation means 6 may be omitted.

Further, the projector 3 is provided above the half mirror 4 and the ring member 5 is provided to be able to tilt in the front-back direction with the front part 52 faced upward according to the embodiment, but the projector 3 may be installed at an appropriate position relative to the half mirror 4, and may be any one capable of projecting an image toward a crossing direction with the front-back direction. At this time, when the ring member 5 tilts the front part 52 toward the projector 3, the ring member 5 can be tilted in a small space similarly as in the embodiment. Further, the ring member 5 may be provided not to be able to tilt without the tilt unit 71.

The ring member 5 is provided to be horizontally movable in the width direct ion of the vehicle according to the embodiment, but the ring member 5 may be provided to be horizontally movable in anyone direction along the virtual image plane Im depending on movement of an image, and may be provided to be horizontally movable in the vertical direction when an image moves in the vertical direction, for example. Further, when an image does not move or the ring member 5 does not surround an image after its movement, the ring member 5 may be provided not to be horizontally movable.

The circular ring member 5 surrounding part of an image as decorative member is exemplified according to the embodiment, but the decorative member may be any member capable of emphasizing an image in combination therewith or enhancing visibility or design, may be a ring member for surrounding an entire image, may be formed to be polygonal, or may have any shape not surrounding an image.

Further, the first image A1 not combined with the ring member 5, the second image A2 combined with the ring member 5 at the erect position, and the third image A3 combined with the ring member 5 at the tilt position are exemplified as images displayed by the vehicle display device 1 according to the embodiment, but the vehicle display device may display an image to be combined with the ring member 5 positioned between the erect position and the tilt position.

The meter ECU as control means controls the irradiation means 6 to switch the ring member 5 between the bright state and the dark state according to the embodiment, but the irradiation means 6 may be configured to light along with projection of an image by the projector 3 and the vehicle display device 1 may display only a combination of the ring member 5 and an image.

Additionally, the best mode for carrying out the present invention, the method, and the like are disclosed above, but the present invention is not limited thereto. That is, the present invention is specifically illustrated and described mainly by use of an embodiment, but the above embodiment may be variously modified in shape, material, quantity, and other detailed configurations by those skilled in the art without departing from the technical spirit and scope of the present invention. Therefore, the description limiting the shape, material, and the like disclosed above is merely exemplary for easy understanding of the present invention, and does not intend to limit the present invention, and thus the notation with the names of members without part of the limitations on the shape, material, and the like or all the limitations is encompassed in the present invention.

REFERENCE SIGNS LIST

1 Vehicle display device
3 Projector
4 Half mirror (reflective member)
5 Ring member (decorative member)
6 Irradiation means (light emitting means)
53 LED (light emitting member, light emitting means)
I Instrument panel

The invention claimed is:

1. A vehicle display device provided in an instrument panel of a vehicle for displaying an image toward a passenger, comprising:
   a projector which projects the image toward a crossing direction which is perpendicular to a front-back direction of the vehicle;
   a reflective member which reflects the image projected by the projector toward a rear side of the vehicle and which transmits a light from a front side of the vehicle;
   a decorative member provided closer to the front side of the vehicle than the reflective member; and
   a light emitting unit which illuminates the decorative member such that the decorative member is visible from the rear side of the vehicle through the reflective member, wherein
   the decorative member is visible in combination with the image,
   a tilt angle of the decorative member is changeable with respect to the front-back direction.

2. The vehicle display device according to claim 1, further comprising:
   a control unit which is configured to switch the light emitting unit from a bright state, in which the decorative member is visible and a dark state in which the decorative member is not visible by switching on or off the light emitting unit depending on the image.

3. The vehicle display device according to claim 2,
wherein the light emitting unit includes at least one of an irradiation unit which irradiates a light toward the decorative member and a light emitting member provided in the decorative member which irradiates the decorative member.

4. The vehicle display device according to claim 1,
wherein the light emitting unit includes at least one of an irradiation unit which irradiates a light toward the decorative member and a light emitting member provided in the decorative member which illuminates the decorative member.

5. The vehicle display device according to claim 1,
wherein the projector is provided above the reflective member,
the reflective member includes a reflective face and is tilted with the reflective face faced toward the projector and the rear side of the vehicle, and
the tilt angle of the decorative member is changeable such that the decorative member may be set between an erect position in which a front part of the decorative member is faced toward the rear side of the vehicle and a tilt position in which the front part of the decorative member is tilted to be faces upward relative to the erect position.

6. The vehicle display device according to claim 1,
wherein the decorative member is horizontally movable in one direction in a crossing plane which is perpendicular to the front-back direction.

7. The vehicle display device according to claim 1,
wherein the decorative member is formed into a circle shape so as to surround at least part of the image reflected by the reflective member and is visible to the passenger.

8. The vehicle display device according to claim 1,
wherein the decorative member includes a plurality of grooves formed on an outer periphery thereof.

9. The vehicle display device according to claim 8,
wherein the grooves are spaced at equal intervals.

10. The vehicle display device according to claim 9,
wherein the grooves serve as a gauge for information included in the image.

* * * * *